(12) United States Patent
Wang

(10) Patent No.: US 12,150,104 B2
(45) Date of Patent: Nov. 19, 2024

(54) METHOD AND DEVICE FOR TRANSMISSION BANDWIDTH DETERMINATION

(71) Applicant: Beijing Unisoc Communications Technology Co., Ltd., Beijing (CN)

(72) Inventor: Hualei Wang, Beijing (CN)

(73) Assignee: Beijing Unisoc Communications Technology Co., Ltd., Beijing (CN)

(*) Notice: Subject to any disclaimer, the term of this patent is extended or adjusted under 35 U.S.C. 154(b) by 327 days.

(21) Appl. No.: 17/677,092

(22) Filed: Feb. 22, 2022

(65) Prior Publication Data
US 2022/0183007 A1 Jun. 9, 2022

Related U.S. Application Data

(63) Continuation of application No. PCT/CN2020/109138, filed on Aug. 14, 2020.

(30) Foreign Application Priority Data

Aug. 23, 2019 (CN) ............................ 201910786260

(51) Int. Cl.
*H04W 72/04* (2023.01)
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC ................ H04W 72/0453; H04W 72/23; H04L 5/0053; H04L 5/0094
See application file for complete search history.

(56) References Cited

U.S. PATENT DOCUMENTS

| 10,397,924 B2 | 8/2019 | Hussain et al. |
| 10,660,100 B2 | 5/2020 | Hussain et al. |
| 2018/0049201 A1 | 2/2018 | Hussain et al. |

(Continued)

FOREIGN PATENT DOCUMENTS

| CA | 3151676 A1 * | 2/2021 | ........ H04W 52/0216 |
| CN | 104144449 A | 11/2014 | |

(Continued)

OTHER PUBLICATIONS

PCT International Search Report and Written Opinion mailed Nov. 4, 2020 issued in corresponding International Application No. PCT/CN2020/109138 (7 pgs.).

(Continued)

*Primary Examiner* — Lan-Huong Truong
(74) *Attorney, Agent, or Firm* — Finnegan, Henderson, Farabow, Garrett & Dunnner, LLP

(57) ABSTRACT

This disclosure relates to a transmission bandwidth determination method and a transmission bandwidth determination device applied in a terminal. The transmission bandwidth determination method includes: receiving network configuration information, the network configuration information containing an information indication; and determining, based on the information indication, whether downlink control information contains transmission bandwidth indication information.

14 Claims, 8 Drawing Sheets

(56) References Cited

U.S. PATENT DOCUMENTS

| | | | |
|---|---|---|---|
| 2019/0082431 A1* | 3/2019 | Yi | H04W 72/0446 |
| 2019/0349935 A1 | 11/2019 | Hussain et al. | |
| 2019/0357215 A1* | 11/2019 | Zhou | H04W 76/36 |
| 2020/0145062 A1* | 5/2020 | Jung | H04W 72/23 |
| 2020/0245331 A1 | 7/2020 | Hussain et al. | |
| 2020/0314880 A1* | 10/2020 | Cirik | H04W 72/53 |

FOREIGN PATENT DOCUMENTS

| | | |
|---|---|---|
| CN | 109803422 A | 5/2019 |
| CN | 110519850 A | 11/2019 |

OTHER PUBLICATIONS

Extended European search report from European Patent Office for European Application No. 20859446.5 mailed Sep. 8, 2023 (7 pgs.).

\* cited by examiner

METHOD AND DEVICE FOR TRANSMISSION BANDWIDTH DETERMINATION

CROSS-REFERENCE TO RELATED APPLICATIONS

The present application is a continuation of International Application No. PCT/CN2020/109138, filed on Aug. 14, 2020, entitled "TRANSMISSION BANDWIDTH DETERMINATION METHOD AND DEVICE," which claims priority to Chinese Patent Application Serial No. 201910786260.9, filed on Aug. 23, 2019, entitled "TRANSMISSION BANDWIDTH DETERMINATION METHOD AND DEVICE," both of which are incorporated herein by reference in their entireties.

TECHNICAL FIELD

This disclosure relates to the field of wireless communication technology and in particular to a method and a device for determining a transmission bandwidth.

BACKGROUND

In a system that uses a single-carrier waveform in its downlink (DL), such as a satellite system or a high frequency system, the Discrete Fourier Transform (DFT) length, i.e., the transmission bandwidth, is at the cell level; in other words, all users in a cell have the same transmission bandwidth. Currently, however, new satellite program standards do not provide any specific method for configuring transmission bandwidth indication information. In particular, if no transmission bandwidth indication information is included in downlink control information (DCI), then currently there is no specific solution to the issue, so such information cannot be obtained by a terminal. As a result, the terminal is unable to determine the transmission bandwidth and frequency domain location in the data transmission, which in turn causes the terminal to experience decoding failures or errors.

SUMMARY

This disclosure provides a method and a device for determining a transmission bandwidth, thus enabling a terminal to determine the transmission bandwidth and avoid decoding failures or errors.

In some embodiments of the present disclosure, a transmission bandwidth determination method applied in a terminal includes receiving network configuration information containing an information indication; and determining, based on the information indication, whether downlink control information contains transmission bandwidth indication information.

In some embodiments of the present disclosure, a transmission bandwidth determination device applied in a terminal includes a receiving unit configured to receive network configuration information containing an information indication; and a determining unit configured to determine, based on the information indication, whether downlink control information contains transmission bandwidth indication information.

In some embodiments of the present disclosure, a terminal includes: a processor; and a memory device configured to store a set of instructions executable by the processor, in which the processor is configured to implement the aforementioned transmission bandwidth determination method when executing the set of instructions.

In some embodiments of the present disclosure, a non-volatile computer readable storage medium stores a set of computer program instructions that is executable by a processor, in which the set of computer program instructions, when executed by the processor, implements the aforementioned transmission bandwidth determination method.

Other features and aspects of the disclosure will be made clear by the following detailed description of exemplary embodiments in reference to the drawings.

BRIEF DESCRIPTION OF THE DRAWINGS

Drawings contained in the Description and constituting a part of the Description, together with the Description, show exemplary embodiments, features, and aspects of the disclosure and are used for explaining principles in the disclosure.

DETAILED DESCRIPTION

Figure 1:
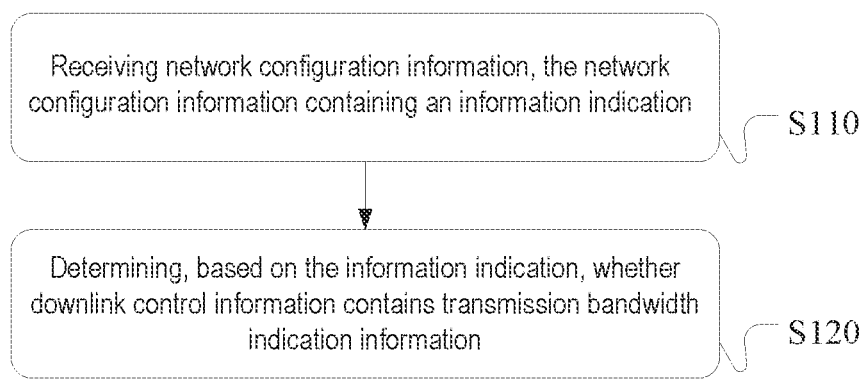
FIG. 1 is a flowchart illustrating a transmission bandwidth determination method, according to one embodiment in this disclosure.

Exemplary embodiments, features, and aspects of the disclosure will be described below in detail in reference to the drawings. Identical markings in the drawings represent elements that have the same or similar functions. Although the drawings illustrate various aspects of the embodiments, the drawings are not necessarily created in proportion unless specifically indicated so.

The specific term "exemplary" in this document means "being used as an example or embodiment, or illustrative." In this document, any embodiment that is described as "exemplary" is not necessarily interpreted as being superior or better than other embodiments.

Additionally, many specific details are provided in the detailed description below to better describe the disclosure. Persons of ordinary skill in the art should understand that the disclosure may be implemented even without certain specific details. In some embodiments, no detailed description is provided on methods, means, elements, and circuits that are well known to persons of ordinary skill in the art so as to stay focused on the theme of the disclosure.

Embodiments provided in this disclosure may be adapted for 5G (5 generation) communication systems, 4G communication systems, 3G communication systems, satellite systems, or various communication systems evolved in the future, such as 6G and 7G communication systems.

Embodiments in this disclosure are also adapted for various network architectures, including but not limited to a relay network architecture, a dual link architecture, and a vehicle-to-everything architecture.

"5G CN," as mentioned in the embodiments in this disclosure, may also be referred to as new core network, 5G New Core, next generation core (NGC) network, etc. The 5G CN is set independently from existing core networks, such as evolved packet core (EPC) networks.

In the embodiments in this disclosure, a base station (BS), also referred to as base station equipment or network element equipment, is a device deployed in a radio access network (RAN) to provide wireless communication functions. Examples of equipment that provide base station functions include base transceiver stations (BTSs) and base station controllers (BSCs) in 2G networks, Nodes B and radio network controllers (RNCs) in 3G networks, evolved Nodes B (eNBs) in 4G networks, access points (APs) in wireless local area networks (WLANs), Next Generation Nodes B (gNBs) in 5G New Radio (NR), and equipment that provide base station functions in new communication systems in the future.

In the embodiments in this disclosure, a terminal may refer to an access terminal, a user unit, user equipment, user station, mobile station (MS), remote station, remote terminal, mobile equipment, user terminal, terminal equipment, wireless communication equipment, user agent, or user device of various forms. The user equipment may also be a cellular phone, a cordless phone, a Session Initiation Protocol (SIP) phone, a Wireless Local Loop (WLL) station, a Personal Digital Assistant (PDA), a handheld equipment or a computing equipment with wireless communication functions or other processing equipment, in-vehicle equipment, or wearable equipment connected to a wireless modem, user equipment in a future 5G network, terminal equipment in a Public Land Mobile Network (PLMN) evolved in the future, etc. The embodiments in the disclosure do not impose any limitation in this regard.

In the embodiments in the disclosure, a downlink (DL) is defined as a one-way communication link from an access network to a terminal, downlink data is data transmitted on a downlink, and the direction of transmission of downlink data is referred to as the downlink direction. An uplink (UL) is defined as a one-way communication link from a terminal to an access network, uplink data is data transmitted on an uplink, and the direction of transmission of uplink data is referred to as the uplink direction.

It should be understood that the term "and/or" in this document simply describes the relationship between related subjects and indicates three possible relationships. For example, "A and/or B" may indicate: A alone, A and B, or B alone. Additionally, the symbol "/" in this document indicates an "or" relationship between the related subjects that precedes and follows it, respectively.

In the embodiments in the disclosure, "plurality" refers to two or more than two. "First," "second," and similar descriptions in the embodiments in the disclosure are used only for the purposes of illustration and distinguishing subjects being described. These expressions neither assign any order nor specifically limit the number of equipment in the embodiments in the disclosure. They do not constitute any limitation on the embodiments in the disclosure.

"Connection/connect" in the embodiments in the disclosure refers to a direct or indirect connection by various means to implement communication between equipment. The embodiments in the disclosure do not impose any limitation in this respect.

In the embodiments in the disclosure, "network" and "system" are meant to express the same concept, i.e., the communication system is a communication network. "Connection/connect" in the embodiments in the disclosure refers to a direct or indirect connection by various means, such as connecting different equipment through a communication interface. There is no limitation in this regard.

Based on the implementations of the various aspects of the disclosure, the terminal may, through network configuration information, determine whether downlink control information (DCI) contains transmission bandwidth indication information, and determine a transmission bandwidth and a frequency domain location using corresponding approaches depending on whether the downlink control information contains the transmission bandwidth indication information. As a result, the terminal can, in either scenario, determine the transmission bandwidth and frequency domain location. Thus, it can be ensured that the terminal avoids decoding failures or errors to the extent possible.

Furthermore, a Discrete Fourier Transform (DFT) length and frequency domain resource mapped from a DFT output, or an Inverse Discrete Fourier Transform (IDFT) input and length, may also be determined based on the transmission bandwidth and the frequency domain location.

FIG. 1 is a flowchart illustrating a transmission bandwidth determination method, according to one embodiment in the disclosure. Specifically, the method may be applied in a terminal. As shown in FIG. 1, the method includes steps S110 and S120.

In step S110, the terminal receives network configuration information. The network configuration information contains an information indication.

Here, the network configuration information may be configured by the network layer and include a high layer information indication. The network configuration information may be sent from a network layer server to the terminal or be obtained by the terminal from the network layer.

In one embodiment according to this disclosure, the information indication may be used for indicating whether downlink control information (DCI) contains transmission bandwidth indication information.

In a satellite system, the format of the DCI may be as shown in Table 1 below:

TABLE 1

| Identifier | 1 bit |
|---|---|
| Resource assignment | $[\log_2(N_{RB}^{UL}(N_{RB}^{UL} + 1)/2)]$ bits |
| Time domain resource assignment | 4 bits |
| Transmission bandwidth resource indication | 4 bits |
| Modulation and coding scheme | 5 bits |
| New data indication | 1 bit |
| Redundancy version | 2 bits |
| HARQ process number | 6 bits |
| TPC command | 2 bits |
| Uplink control channel resource indication | 3 bits |

Here, the transmission bandwidth indication information (i.e., the transmission bandwidth resource indication in Table 1) may be information used for indicating a transmission bandwidth, i.e., the terminal may determine the transmission bandwidth and/or a frequency domain location with the transmission bandwidth indication information. For example, in one embodiment according to the disclosure, the transmission bandwidth indication information may be a Start and Length Indication Value (SLIV). SLIV may indicate the transmission bandwidth and a starting point of the frequency domain (e.g., starting from which frequency point). The terminal may determine the transmission bandwidth indicated by the SLIV to be the transmission bandwidth for its data transmission. Of course, in other embodiments according to this disclosure, the transmission bandwidth indication information may be indication information of another form, e.g., Radio Resource Control (RRC) configuration options. In summary, the terminal may, based on the transmission bandwidth indication information, determine its transmission bandwidth and/or frequency domain location. This disclosure does not impose any limitation on the specific form of the transmission bandwidth information.

In step S120, the terminal determines, based on the information indication, whether downlink control information contains transmission bandwidth indication information.

In some embodiments according to this disclosure, the downlink control information (DCI) may contain the transmission bandwidth indication information. In some other embodiments according to this disclosure, the DCI may not contain the transmission bandwidth indication information. In these two scenarios, the approach employed by the terminal to determine the transmission bandwidth and/or frequency domain location may vary. Therefore, the terminal may, based on network configuration information of the network layer, obtain indication information that indicates whether the DCI contains the transmission bandwidth indication information, and, based on the indication information, determine whether the DCI contains the transmission bandwidth indication information. Then, the terminal takes a corresponding approach to determine the transmission bandwidth and/or frequency domain location.

Figure 2:
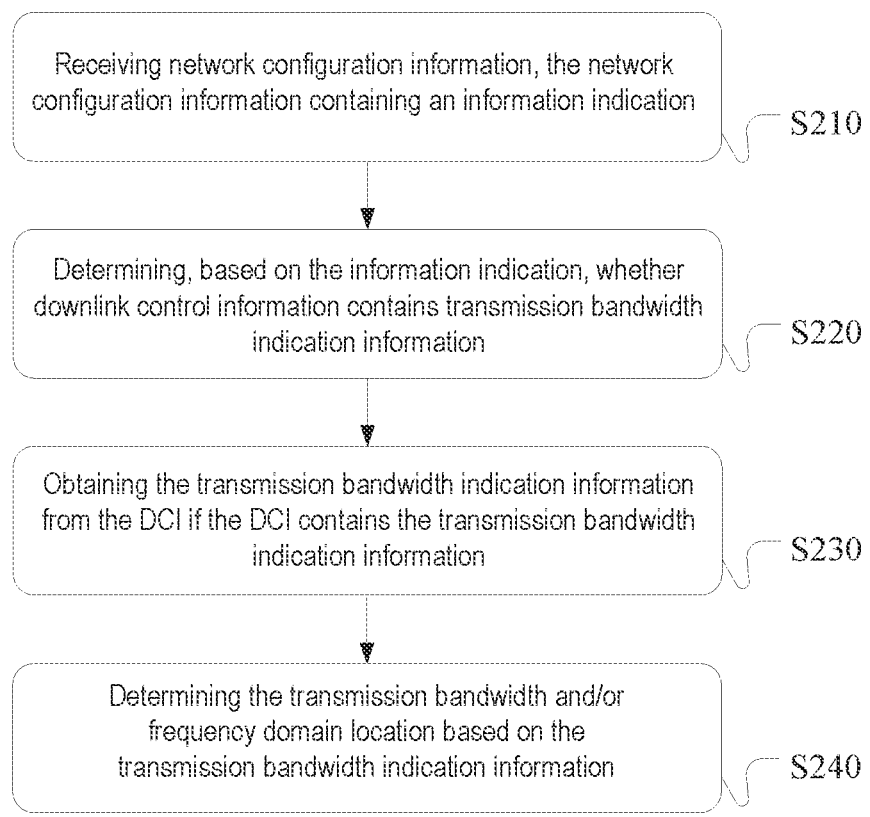
FIG. 2 is a flowchart illustrating a transmission bandwidth determination method, according to another embodiment in this disclosure.

FIG. 2 is a flowchart illustrating a transmission bandwidth determination method, according to another embodiment in the disclosure. Specifically, the method may be applied in a terminal. As shown in FIG. 2, the method includes steps S210, S220, S230, and S240.

In step S210, the terminal receives network configuration information, the network configuration information containing an information indication.

Here, the network configuration information may be configured by the network layer and include a high layer information indication. The network configuration information may be sent from a network layer server to the terminal or obtained by the terminal from the network layer.

In one embodiment according to this disclosure, the information indication may be used for indicating whether downlink control information (DCI) contains transmission bandwidth indication information.

Here, the transmission bandwidth indication information is information used for indicating a transmission bandwidth, i.e., the terminal may determine the transmission bandwidth and/or a frequency domain location according to the transmission bandwidth indication information. For example, in one embodiment according to the disclosure, the transmission bandwidth indication information may be the Start and Length Indication Value (SLIV). SLIV may indicate the transmission bandwidth and a starting point of the frequency domain (e.g., starting from which frequency point), and the terminal may determine the transmission bandwidth indicated by the SLIV to be the transmission bandwidth for its data transmission. Of course, in other embodiments according to this disclosure, the transmission bandwidth indication information may be indication information of another form, e.g., an RRC configuration table or candidates. In summary, the terminal may, based on the transmission bandwidth indication information, determine its transmission bandwidth and/or frequency domain location. This disclosure does not impose any limitation on the specific form of the transmission bandwidth information.

In step S220, the terminal determines, based on the information indication, whether downlink control information contains transmission bandwidth indication information.

In some embodiments according to this disclosure, the downlink control information (DCI) may contain the transmission bandwidth indication information. In some other embodiments according to this disclosure, the DCI may not contain the transmission bandwidth indication information. In these two scenarios, the approach employed by the terminal to determine the transmission bandwidth may vary. Therefore, the terminal may, based on network configuration information of the Network layer, obtain indication information that indicates whether the DCI contains the transmission bandwidth indication information, and, based on the indication information, determine whether the DCI contains the transmission bandwidth indication information. Then, the terminal takes a corresponding approach to determine the transmission bandwidth and/or frequency domain location.

In step S230, the terminal obtains the transmission bandwidth indication information from the DCI if the DCI contains the transmission bandwidth indication information.

If the terminal has, based on the indication information, determined that the DCI contains the transmission bandwidth indication information, then the terminal obtains the transmission bandwidth indication information from the DCI that it receives.

In step S240, the terminal determines the transmission bandwidth and/or frequency domain location based on the transmission bandwidth indication information.

In some embodiments according to this disclosure, the terminal may determine, based on the transmission bandwidth indication information, the transmission bandwidth only. In some other embodiments according to this disclosure, the terminal may determine, based on the transmission bandwidth indication information, both the transmission bandwidth and frequency domain location. In some other embodiments according to this disclosure, alternatively, the terminal may determine, based on the transmission bandwidth indication information, the frequency domain location only. Here, the frequency domain location refers to a frequency location at which the terminal receives downlink data. For example, the frequency domain location may be a starting frequency domain location.

Here, in some embodiments according to this disclosure, the transmission bandwidth indication information may include the Start and Length Indication Value (SLIV). The SLIV may indicate the transmission bandwidth and a starting point of the frequency domain (e.g., starting from which frequency), and, correspondingly, the terminal may determine the transmission bandwidth indicated by the SLIV to be the transmission bandwidth for its data transmission and frequency domain location.

In some embodiments according to this disclosure, determining the transmission bandwidth and/or a frequency domain location based on the transmission bandwidth indication information includes: selecting, based on a code point corresponding to the transmission bandwidth indication information, the transmission bandwidth information from code points corresponding to one or a plurality of pieces of candidate transmission bandwidth information configured by the network layer; and determining, based on the selected transmission bandwidth information, the transmission bandwidth and/or frequency domain location indicated by the transmission bandwidth indication information.

Here, in some embodiments according to this disclosure, the code points corresponding to the one or plurality of pieces of candidate transmission bandwidth information may be configured by the network layer. A specific configuration process may include: configuring, by the RRC, a plurality of pieces of transmission bandwidth information; furthermore, optionally, selecting one or a plurality of pieces of candidate transmission bandwidth information from the plurality of pieces of transmission bandwidth information; and mapping the one or plurality of pieces of candidate transmission bandwidth information to the code points of the transmission bandwidth indication information in a field of the DCI.

Here, the plurality of pieces of transmission bandwidth information may be configured by the RRC layer, and the selection of the one or plurality of pieces of candidate transmission bandwidth information may be performed by the MAC layer. Of course, the selection may alternatively be performed by another layer of the network layer. This disclosure does not impose any limitation in this regard.

Here, the code point may be understood as a value in the transmission bandwidth indication information. Mapping the one or plurality of candidate transmission bandwidths to the code points of the transmission bandwidth indication information in a field of the DCI may be using values in the transmission bandwidth indication information to represent the candidate transmission bandwidths. For example, each value represents a candidate transmission bandwidth. There may be many methods for such representation. For example, a value may be used to represent the starting point and length of a candidate transmission bandwidth.

Code points corresponding to the transmission bandwidth indication information represent various candidate transmission bandwidths. Thus, a transmission bandwidth may be selected from these code points representing candidate transmission bandwidths, as needed, to be the transmission bandwidth indicated by the transmission bandwidth indication information.

Figure 3:
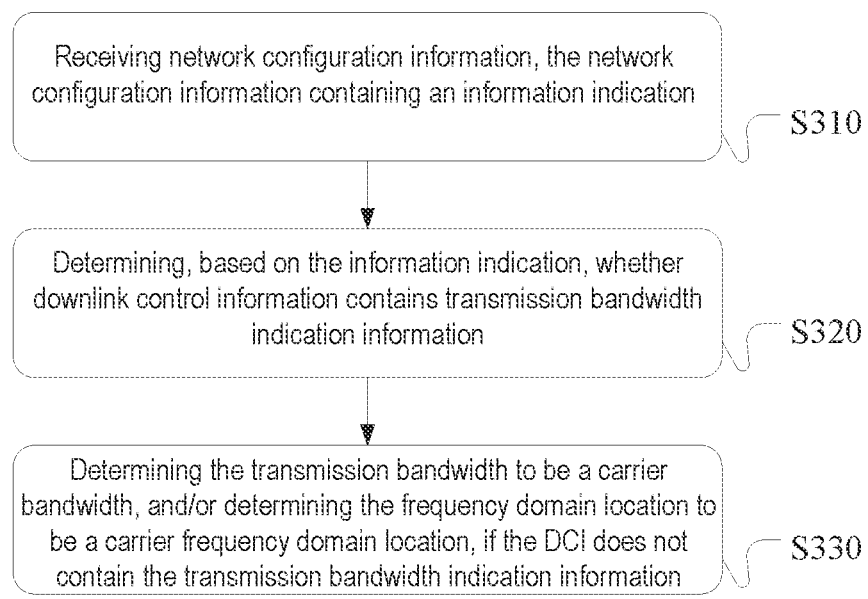
FIG. 3 is a flowchart illustrating a transmission bandwidth determination method, according to yet another embodiment in this disclosure.

FIG. 3 is a flowchart illustrating a transmission bandwidth determination method, according to another embodiment in the disclosure. The method may be applied in a terminal. Specifically, as shown in FIG. 3, the method includes steps S310, S320, and S330.

In step S310, the terminal receives network configuration information, the network configuration information containing an information indication.

Here, the network configuration information may be configured by the network layer and include a high layer information indication. The network configuration information may be sent from a network layer server to the terminal or obtained by the terminal from the network layer.

In one embodiment according to this disclosure, the information indication may be used for indicating whether downlink control information (DCI) contains transmission bandwidth indication information.

Here, the transmission bandwidth indication information is information used for indicating a transmission bandwidth, i.e., the terminal may determine the transmission bandwidth and/or a frequency domain location with the transmission bandwidth indication information. For example, in one embodiment according to the disclosure, the transmission bandwidth indication information may be the Start and Length Indication Value (SLIV). SLIV may indicate the transmission bandwidth and a starting point of the frequency domain (e.g., starting from which frequency), and the terminal may determine the transmission bandwidth indicated by the SLIV to be the transmission bandwidth for its data transmission. Of course, in other embodiments according to this disclosure, the transmission bandwidth indication information may be indication information of another form, e.g., the RRC configuration table, etc. In summary, the terminal may, based on the transmission bandwidth indication information, determine its transmission bandwidth and/or frequency domain location. This disclosure does not impose any limitation on the specific form of the transmission bandwidth information.

In step S320, the terminal determines, based on the information indication, whether downlink control information contains transmission bandwidth indication information.

In some embodiments according to this disclosure, the downlink control information (DCI) may contain the transmission bandwidth indication information. In some other embodiments according to this disclosure, the DCI may not contain the transmission bandwidth indication information. In these two scenarios, the approach employed by the terminal to determine the transmission bandwidth may vary. Therefore, the terminal may, based on network configuration information of the network layer, obtain indication information that indicates whether the DCI contains the transmission bandwidth indication information, and, based on the indication information, determine whether the DCI contains the transmission bandwidth indication information. Then, the terminal takes a corresponding approach to determine the transmission bandwidth and/or frequency domain location.

In step S330, the terminal determines the transmission bandwidth to be a carrier bandwidth, and/or determines the frequency domain location to be a carrier frequency domain location, if the DCI does not contain the transmission bandwidth indication information.

Here, the carrier bandwidth may be a default carrier bandwidth of a system in which the terminal is located. Correspondingly, the frequency domain location may be a default carrier frequency domain location of a system in which the terminal is located.

Figure 4:
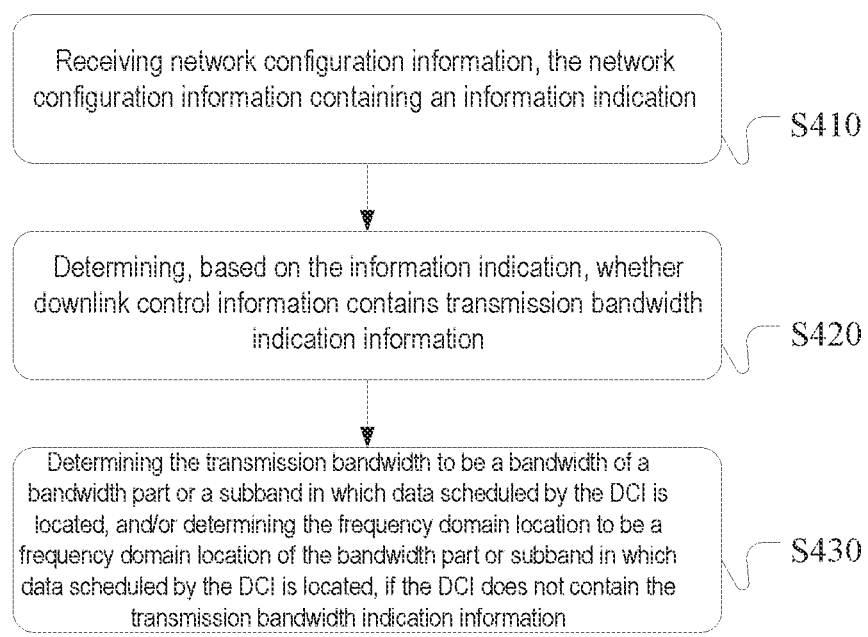
FIG. 4 is a flowchart illustrating a transmission bandwidth determination method, according to yet another embodiment in this disclosure.

FIG. 4 is a flowchart illustrating a transmission bandwidth determination method, according to yet another embodiment in the disclosure. The method may be applied in a terminal. Specifically, as shown in FIG. 4, the method includes steps S410, S420, and S430.

In step S410, the terminal receives network configuration information, the network configuration information containing an information indication.

Here, the network configuration information may be configured by the network layer and include a high layer information indication. The network configuration information may be sent from a network layer server to the terminal or obtained by the terminal from the network layer.

In one embodiment according to this disclosure, the information indication may be used for indicating whether downlink control information (DCI) contains transmission bandwidth indication information.

Here, the transmission bandwidth indication information is information used for indicating a transmission bandwidth, i.e., the terminal may determine the transmission bandwidth and/or a frequency domain location with the transmission bandwidth indication information. For example, in one embodiment according to the disclosure, the transmission bandwidth indication information may be the Start and Length Indication Value (SLIV). SLIV may indicate the transmission bandwidth and a starting point of the frequency domain (e.g., starting from which frequency), and the terminal may determine the transmission bandwidth indicated by the SLIV to be the transmission bandwidth for its data transmission. Of course, in other embodiments according to this disclosure, the transmission bandwidth indication information may be indication information of another form, e.g., the RRC configuration table, etc. In summary, the terminal may, based on the transmission bandwidth indication information, determine its transmission bandwidth and/or frequency domain location. This disclosure does not impose any limitation on the specific form of the transmission bandwidth information.

In step S420, the terminal determines, based on the information indication, whether downlink control information contains transmission bandwidth indication information.

In some embodiments according to this disclosure, the downlink control information (DCI) may contain the transmission bandwidth indication information. In some other embodiments according to this disclosure, the DCI may not contain the transmission bandwidth indication information. In these two scenarios, the approach employed by the terminal to determine the transmission bandwidth may vary. Therefore, the terminal may, based on network configuration information of the Network layer, obtain indication information that indicates whether the DCI contains the transmission bandwidth indication information, and, based on the indication information, determine whether the DCI contains the transmission bandwidth indication information. Then, the terminal takes a corresponding approach to determine the transmission bandwidth and/or frequency domain location.

In step S430, the terminal determines the transmission bandwidth to be a bandwidth of a bandwidth part (BWP) or a subband in which data scheduled by the DCI is located, and/or determines the frequency domain location to be a frequency domain location of the BWP or the subband in which data scheduled by the DCI is located, if the DCI does not contain the transmission bandwidth indication information.

Here, the data may contain data of one or a plurality of users, and any of the frequency domain locations indicated contains data of one or a plurality of users.

The frequency domain location may be a continuous frequency domain location. The frequency domain location is used for indicating a specific DFT operation, i.e., DFT length, and mapping of a DFT output; or for indicating a specific IDFT (Inverse Discrete Fourier Transform) operation, i.e., obtaining an IDFT input, and IDFT length. It is noted that the transmission bandwidth here is not resource assignment of sample time domain of a certain terminal.

Figure 5:
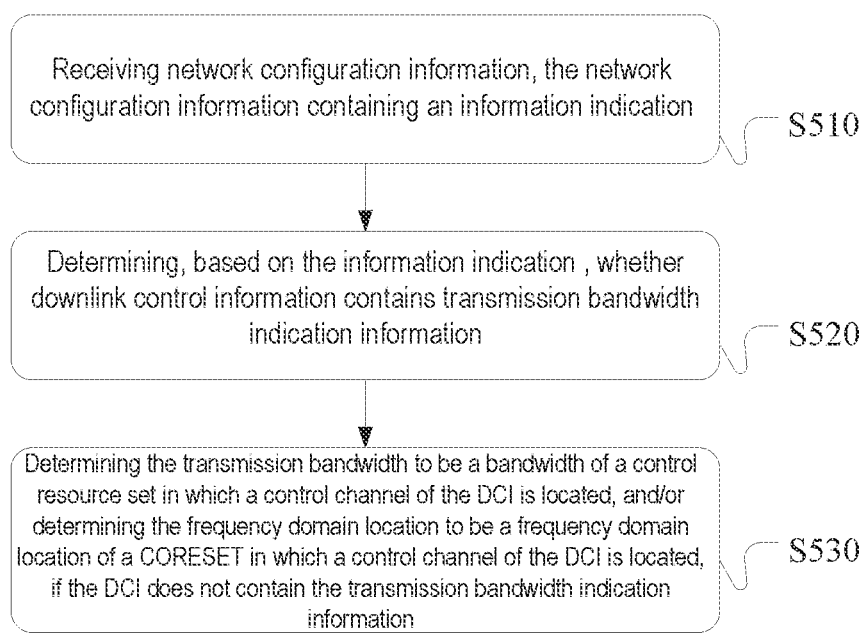
FIG. 5 is a flowchart illustrating a transmission bandwidth determination method, according to yet another embodiment in this disclosure.

FIG. 5 is a flowchart illustrating a transmission bandwidth determination method, according to yet another embodiment in the disclosure. The method may be applied in a terminal. Specifically, as shown in FIG. 5, the method includes steps S510, S520, and S530.

In step S510, the terminal receives network configuration information, the network configuration information containing an information indication.

Here, the network configuration information may be configured by the network layer and include a high layer information indication. The network configuration information may be sent from a Network layer server to the terminal or obtained by the terminal from the network layer.

In one embodiment according to this disclosure, the information indication may be used for indicating whether downlink control information (DCI) contains transmission bandwidth indication information.

Here, the transmission bandwidth indication information is information used for indicating a transmission bandwidth, i.e., the terminal may determine the transmission bandwidth and/or a frequency domain location with the transmission bandwidth indication information. For example, in one embodiment according to the disclosure, the transmission bandwidth indication information may be the Start and Length Indication Value (SLIV). SLIV may indicate the transmission bandwidth and a starting point of the frequency domain (e.g., starting from which frequency), and the terminal may determine the transmission bandwidth indicated by the SLIV to be the transmission bandwidth for its data transmission. Of course, in other embodiments according to this disclosure, the transmission bandwidth indication information may be indication information of another form, e.g., the RRC configuration table. In summary, the terminal may, based on the transmission bandwidth indication information, determine its transmission bandwidth and/or frequency domain location. This disclosure does not impose any limitation on the specific form of the transmission bandwidth information.

In step S520, the terminal determines, based on the information indication, whether downlink control information contains transmission bandwidth indication information.

In some embodiments according to this disclosure, the downlink control information (DCI) may contain the transmission bandwidth indication information. In some other embodiments according to this disclosure, the DCI may not contain the transmission bandwidth indication information. In these two scenarios, the approach employed by the terminal to determine the transmission bandwidth may vary. Therefore, the terminal may, based on network configuration information of the network layer, obtain indication information that indicates whether the DCI contains the transmission bandwidth indication information, and, based on the indication information, determine whether the DCI contains the transmission bandwidth indication information. Then, the terminal takes a corresponding approach to determine the transmission bandwidth and/or frequency domain location.

In step S530, the terminal determines the transmission bandwidth to be a bandwidth of a control resource set (CORESET) in which a control channel of the DCI is located, and/or determines the frequency domain location to be a frequency domain location of a CORESET in which a control channel of the DCI is located, if the DCI does not contain the transmission bandwidth indication information.

Here, the control channel may be a downlink physical control channel, and the CORESET may be a CORESET of the downlink physical control channel. Correspondingly, the transmission bandwidth of the terminal may be determined to be the bandwidth of the CORESET in which the control channel of the DCI is located.

Figure 6:
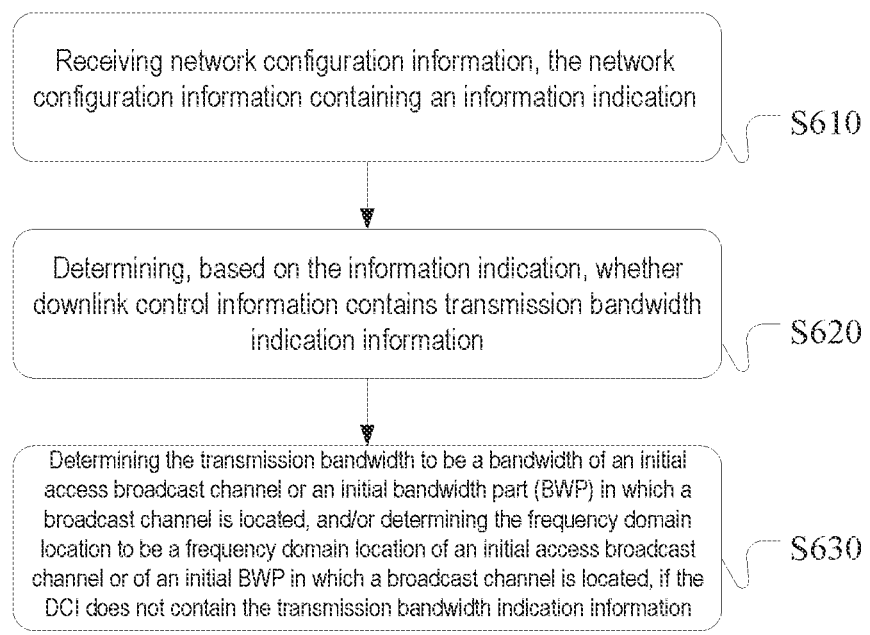
FIG. 6 is a flowchart illustrating a transmission bandwidth determination method, according to yet another embodiment in this disclosure.

FIG. 6 is a flowchart illustrating a transmission bandwidth determination method, according to yet another embodiment in the disclosure. The method may be applied in a terminal. Specifically, as shown in FIG. 6, the method includes steps S610, S620, and S630.

In step S610, the terminal receives network configuration information, the network configuration information containing an information indication.

Here, the network configuration information may be configured by the network layer and include a high layer information indication. The network configuration information may be sent from a network layer server to the terminal or obtained by the terminal from the network layer.

In one embodiment according to this disclosure, the information indication may be used for indicating whether downlink control information (DCI) contains transmission bandwidth indication information.

Here, the transmission bandwidth indication information is information used for indicating a transmission bandwidth, i.e., the terminal may determine the transmission bandwidth and/or a frequency domain location with the transmission bandwidth indication information. For example, in one embodiment according to the disclosure, the transmission bandwidth indication information may be the Start and Length Indication Value (SLIV). SLIV may indicate the transmission bandwidth and a starting point of the frequency domain (e.g., starting from which frequency), and the terminal may determine the transmission bandwidth indicated by the SLIV to be the transmission bandwidth for its data transmission. Of course, in other embodiments according to this disclosure, the transmission bandwidth indication information may be indication information of another form, e.g., the RRC configuration table. In summary, the terminal may, based on the transmission bandwidth indication information, determine its transmission bandwidth and/or frequency domain location. This disclosure does not impose any limitation on the specific form of the transmission bandwidth information.

In step S620, the terminal determines, based on the information indication, whether downlink control information contains transmission bandwidth indication information.

In some embodiments according to this disclosure, the downlink control information (DCI) may contain the transmission bandwidth indication information. In some other embodiments according to this disclosure, the DCI may not contain the transmission bandwidth indication information. In these two scenarios, the approach employed by the terminal to determine the transmission bandwidth may vary. Therefore, the terminal may, based on network configuration information of the network layer, obtain indication information that indicates whether the DCI contains the transmission bandwidth indication information, and, based on the indication information, determine whether the DCI contains the transmission bandwidth indication information. Then, the terminal takes a corresponding approach to determine the transmission bandwidth and/or frequency domain location.

In step S630, the terminal determines the transmission bandwidth to be a bandwidth of an initial access broadcast channel or an initial bandwidth part (BWP) in which a broadcast channel is located, and/or determines the frequency domain location to be a frequency domain location of an initial access broadcast channel or of an initial BWP in which a broadcast channel is located, if the DCI does not contain the transmission bandwidth indication information.

Figure 7:
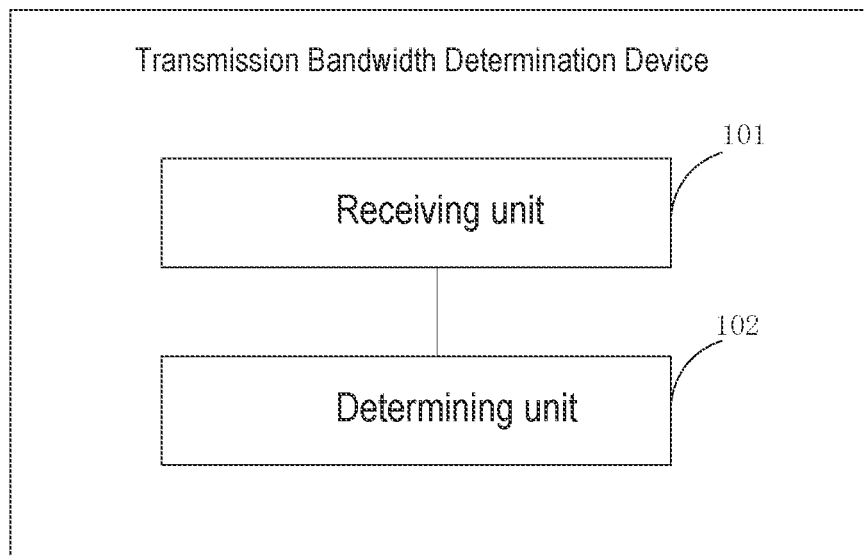
FIG. 7 is a structural diagram illustrating modules of a transmission bandwidth determination device, according to one embodiment in this disclosure.

This disclosure further provides a transmission bandwidth determination device based on the methods described in the embodiments corresponding to FIGS. 1-6 above. FIG. 7 is a structural diagram illustrating modules of a transmission bandwidth determination device, according to one embodiment in the disclosure. The device may be applied in a terminal. Specifically, as shown in FIG. 7, the transmission bandwidth determination device includes: a receiving unit 101 and a determining unit 102. The receiving unit 101 is configured to receive network configuration information, the network configuration information containing an information indication. The determining unit 102 is configured to determine, based on the information indication, whether downlink control information contains transmission bandwidth indication information.

In one embodiment according to this disclosure, the determining unit 102 may further be configured to: obtain the transmission bandwidth indication information from the DCI if the DCI contains the transmission bandwidth indication information; and determine the transmission bandwidth and/or a frequency domain location based on the transmission bandwidth indication information.

In one embodiment according to this disclosure, the determining unit 102 may be configured to: determine the transmission bandwidth to be a carrier bandwidth, and/or determine the frequency domain location to be a carrier frequency domain location, if the DCI does not contain the transmission bandwidth indication information.

In one embodiment according to this disclosure, the determining unit 102 may further be configured to: determine the transmission bandwidth to be a bandwidth of a bandwidth part (BWP) or a subband in which data scheduled by the DCI is located, and/or determine the frequency domain location to be a frequency domain location of a BWP or subband in which data scheduled by the DCI is located, if the DCI does not contain the transmission bandwidth indication information.

In one embodiment according to this disclosure, the determining unit 102 may further be configured to: determine the transmission bandwidth to be a bandwidth of a control resource set (CORESET) in which a control channel of the DCI is located, and/or determine the frequency domain location to be a frequency domain location of a CORESET in which a control channel of the DCI is located, if the DCI does not contain the transmission bandwidth indication information.

In one embodiment according to this disclosure, the determining unit 102 may further be configured to: determine the transmission bandwidth to be a bandwidth of an initial access broadcast channel or an initial bandwidth part (BWP) in which a broadcast channel is located, and/or determine the frequency domain location to be a frequency domain location of an initial access broadcast channel or of an initial BWP in which a broadcast channel is located, if the DCI does not contain the transmission bandwidth indication information.

In one embodiment according to this disclosure, the determining unit 102 may further be configured to: select, based on a code point corresponding to the transmission bandwidth indication information, the transmission bandwidth information from code points corresponding to one or a plurality of pieces of candidate transmission bandwidth information configured by the network layer; and determine, based on the selected transmission bandwidth information, the transmission bandwidth and/or frequency domain location indicated by the transmission bandwidth indication information.

In one embodiment according to this disclosure, a configuration process for the code points corresponding to the one or plurality of pieces of candidate transmission bandwidth information includes: configuring a plurality of pieces of transmission bandwidth information; furthermore, optionally, selecting one or a plurality of pieces of candidate transmission bandwidth information from the plurality of pieces of transmission bandwidth information configured by the RRC; and mapping the one or plurality of pieces of candidate transmission bandwidth information to the code points of the transmission bandwidth indication information in a field of the DCI.

In the embodiments of the aforementioned device, specific ways of execution of processes that are the same or similar to those involved in the embodiments illustrated in FIGS. 1-6 are the same as those provided in the embodiments corresponding to FIGS. 1-6.

Figure 8:
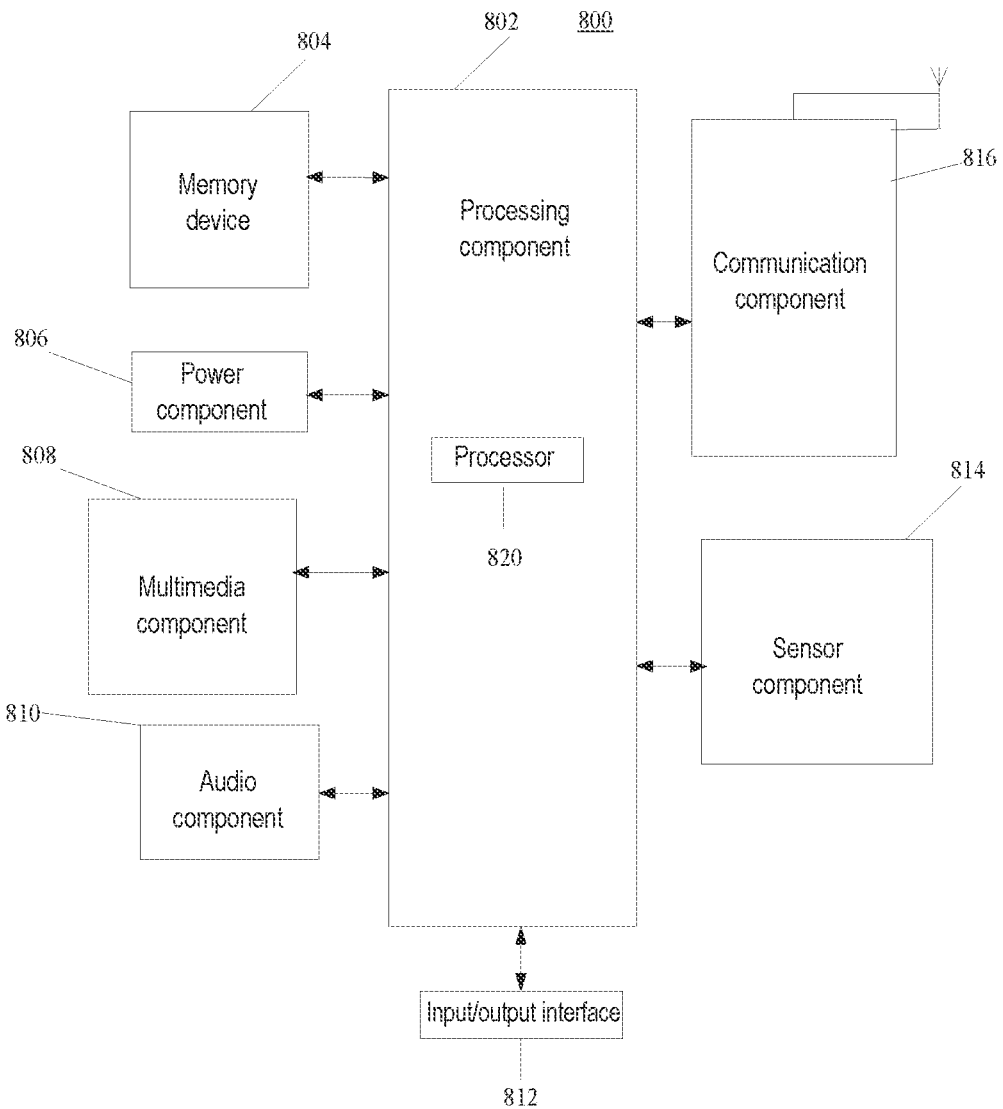
FIG. 8 is a block diagram illustrating a device, according to one exemplary embodiment in this disclosure.

FIG. 8 is a block diagram illustrating a device 800 according to one exemplary embodiment. For example, the device 800 may be a mobile phone, a computer, a digital broadcasting terminal, a messaging device, a game console, a tablet device, a medical device, a fitness device, or a Personal Digital Assistant, etc.

Referring to FIG. 8, the device 800 includes one or a plurality of the following components: a processing component 802, a memory device 804, a power component 806, a multimedia component 808, an audio component 810, an input/output (I/O) interface 812, a sensor component 814, and a communication component 816.

Typically, the processing component 802 controls overall operations of the device 800, such as operations related to display, phone calls, data communication, camera operations, and recording operations. The processing component 802 includes one or a plurality of processors 820 to execute instructions to complete all or some of the steps in the aforementioned methods. Moreover, the processing component 802 includes one or a plurality of modules to facilitate interaction between the processing component 802 and other components. For example, the processing component 802 includes a multimedia module to facilitate interaction between the multimedia component 808 and the processing component 802.

The memory device 804 is configured to store data of various types to support operations on the device 800. Examples of such data include instructions, contacts data, phonebook data, messages, images, and videos used for any application or method operated on the device 800. The memory device 804 may be implemented by any volatile memory device, any non-volatile memory device, or a combination thereof, such as a static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power component 806 provides power to various components of the device 800. The power component 806 includes a power management system, one or a plurality of power supplies, and other components related to the power generation, power management, and power distribution for the device 800.

The multimedia component 808 includes a screen that provides an output interface between the device 800 and a user. In some embodiments, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may not only sense boundary of a touching or sliding action, but also detect the duration and pressure associated with a touching or sliding operation. In some embodiments, the multimedia component 808 includes a front camera and/or a rear camera. When the device 800 is in an operating mode, such as a shooting mode or video mode, the front camera and/or the rear camera may receive external multimedia data. Each front camera and rear camera may be a fixed optical lens system or have the ability to adjust its focus and perform optical zooming.

The audio component 810 is configured to output and/or input audio signals. For example, the audio component 810 includes a microphone (MIC). When the device 800 is in an operating mode, such as a call mode, record mode, or voice recognition mode, the microphone is configured to receive external audio signals. The received audio signals may further be stored in the memory device 804 or sent through the communication component 816. In some embodiments, the audio component 810 further includes a speaker for outputting audio signals.

The I/O interface 812 provides an interface between the processing component 802 and a peripheral interface module, and the peripheral interface module may be a keyboard, click wheel, or button. Such a button may include but is not limited to a home button, volume button, start up button, or lock button.

The sensor component 814 includes one or a plurality of sensors for providing state assessment on various aspects for the device 800. For example, the sensor component 814 may detect the on/off state of the device 800 and relative positioning of components, such as a display and a keypad of the device 800. The sensor component 814 may also detect changes in the location of the device 800 or in the location of a component of the device 800, the existence or nonexistence of contact between the user and the device 800, the orientation or acceleration/deceleration of the device 800, and changes in the temperature of the device 800. The sensor component 814 may include a proximity sensor configured to detect the existence of nearby objects without any physical contact. The sensor component 814 may further include an optical sensor, such as a CMOS or CCD image sensor, for use in an imaging application. In some embodiments, the sensor component 814 may further include an accelerometer, gyro sensor, magnetic sensor, pressure sensor, or temperature sensor.

The communication component 816 is configured to facilitate wired or wireless communication between the device 800 and another equipment. The device 800 may access a communication standard-based wireless network, such as Wi-Fi, 2G, 3G, 4G, or 5G, or a combination thereof. In one exemplary embodiment, the communication component 816 receives broadcast signals or broadcast related information from an external broadcast management system through a broadcast channel. In one exemplary embodiment, the communication component 816 further includes a near field communication (NFC) module to facilitate short-range communication. For example, the NFC module may be implemented based on radio frequency identification (RFID) technology, Infrared Data Association (IrDA) technology, ultra-wideband (UWB) technology, Bluetooth (BT) technology, or another technology.

In an exemplary embodiment, the device 800 may be implemented by one or a plurality of application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for executing the aforementioned methods.

In an exemplary embodiment, a non-volatile computer readable storage medium, e.g., the memory device 804 is further provided. The non-volatile computer readable storage medium includes computer program instructions. The computer program instructions may be executed by the processor 820 of the device 800 to complete the aforementioned methods.

The disclosure may be a system, a method, and/or a computer program product. The computer program product may include a computer readable storage medium that carries a set of computer readable program instructions used for causing the processor to implement various aspects of the disclosure.

The computer readable storage medium may be a tangible device capable of keeping and storing instructions used by instruction-executing device. The computer readable storage medium may be, for example, but is not limited to an electrical memory device, magnetic memory device, optical memory device, electromagnetic memory device, semiconductor memory device, or any suitable combination thereof. More specific examples (a non-exhaustive list) of computer readable storage media include: portable computer disks, hard disks, random access memories (RAMs), read-only memories (ROMs), erasable programmable read-only memories (EPROMs or flash memories), static random-access memories (SRAMs), compact disc read-only memories (CD-ROMs), digital versatile disks (DVDs), memory sticks, floppy disks, mechanical coding device (such as punch cards or raised structures in grooves on which an instruction is stored), and any suitable combination thereof. The computer readable storage medium used here is not to be interpreted as transient signals themselves, such as radio waves, other electromagnetic waves freely propagated, other electromagnetic waves propagated through waveguides or other propagation media (for example, optical pulses through fiber optic cables), or other electrical signals transmitted through electrical wires.

The computer readable program instruction described here may be downloaded from the computer readable storage medium to various computing/processing devices; or downloaded from a network, such as the Internet, a local area network (LAN), a wide area network (WAN), and/or a Wi-Fi network, to an external computer or external memory equipment. The network may comprise a copper transmission cable, fiber optic transmission, wireless transmission, a router, a firewall, a switch, a gateway computer, and/or an edge server. A network adapter card or a network interface in each computing/processing device receives a computer readable program instruction from the network, and forwards the computer readable program instruction to be stored in a computer readable storage medium in a computing/processing device.

The computer program instruction for executing operations of the disclosure may be an assembly instruction, instruction set architecture (ISA) instruction, machine instruction, machine related instruction, microcode, firmware instruction, state setting data, or source code or object code written in one or any combination of a plurality of programming languages; the programming languages comprises an object-oriented programming language (such as Smalltalk and C++), common procedural programming language (such as "C"), or similar programming language. The computer readable program instruction may be executed entirely on a user computer, partially on a user computer, as a standalone software package, partially on a user computer and partially on a remote computer, or entirely on a remote computer or server. When a remote computer is involved, the remote computer may be connected to a user computer through a network of any type, including a LAN network or WAN network; or, may be connected to an external computer (for example, connected through the Internet by using an Internet service provider). In some embodiments, an electrical circuit is customized by state information of a computer readable program instruction; such an electrical circuit may be a programmable logic circuit, field programmable gate array (FPGA), or programmable logic array (PLA); and the electrical circuit may execute a computer readable program instruction to implement various aspects in the disclosure.

This document describes various aspects in the disclosure in reference to flowcharts and/or block diagrams of the methods, devices (systems), and computer program products in the embodiments in the disclosure. It should be understood that each block in the flowcharts and/or block diagrams and combinations of the blocks in the flowcharts and/or block diagrams may all be implemented by computer readable program instructions.

These computer readable program instructions may be provided to a processor of a general purpose computer, a special purpose computer, or another programmable data processing device to produce a machine so as to create, when these instructions are executed by the processor of the computer or the other programmable data processing device, a device that implements functions/actions specified in one or a plurality of blocks in the flowcharts and/or block diagrams. These computer readable program instructions may also be stored in a computer readable storage medium, and these instructions cause a computer, a programmable data processing device, and/or another equipment to work in a certain way; thus, the computer readable medium that stores the instructions comprises a manufacture, which comprises instructions for implementing various aspects of functions/actions specified in one or a plurality of blocks in the flowcharts and/or block diagrams.

The computer readable program instructions may also be loaded to a computer, another programmable data processing device, or another equipment so that a series of operative steps are executed on the computer, the other programmable data processing device, or the other equipment to create a process of computer implementation, thereby causing functions/actions specified in one or a plurality of blocks in the flowcharts and/or block diagrams to be implemented by the instructions executed on the computer, the other programmable data processing device, or the other equipment.

The flowcharts and block diagrams in the drawings illustrate system architectures, functions, and operations that may be implemented by the systems, methods, and computer program products based on a plurality of embodiments in the disclosure. In this regard, each block in the flowcharts or block diagrams may represent a module, program segment, or part of an instruction; the module, program segment, or part of the instruction contains one or a plurality of executable instructions for implementing specified logical functions. In some alternative implementations, functions marked in the blocks may, alternatively, occur in an order different from that marked in the drawings. For example, depending on the functions involved, two consecutive blocks may, in fact, be executed in an essentially parallel way, and sometimes they may, alternatively, be executed in a reverse order. Also to be noted is that each block in the block diagrams and/or flowcharts and combinations of the blocks in the block diagrams and/or flowcharts may be implemented by a special purpose hardware-based system that executes a specified function or action, or by a combination of special purpose hardware and computer instructions.

With respect to the embodiments in the disclosure described above, the descriptions are exemplary and not exhaustive, and are not limited to the disclosed embodiments. Without deviating from the scope and spirit of the embodiments described, many modifications and changes are evident to persons of ordinary skill in the art. Terminology choices in this document are meant to best explain the principles and practical applications of the embodiments or technical improvements of technologies in the market, or to enable other persons of ordinary skill in the art to understand the embodiments disclosed in this document.

What is claimed is:

1. A transmission bandwidth determination method, the transmission bandwidth determination method, applied in a terminal, comprising:
receiving network configuration information, the network configuration information containing an information indication;
determining, based on the information indication, whether downlink control information contains transmission bandwidth indication information;
obtaining the transmission bandwidth indication information from the downlink control information in response to the downlink control information containing the transmission bandwidth indication information; and
determining a transmission bandwidth or a frequency domain location based on the obtained transmission bandwidth indication information, wherein determining the transmission bandwidth or the frequency domain location based on the transmission bandwidth indication information comprises:
selecting, based on a code point corresponding to the transmission bandwidth indication information, transmission bandwidth information from one or more code points corresponding to one or a plurality of pieces of candidate transmission bandwidth information configured by a network layer; and
determining, based on the selected transmission bandwidth information, the transmission bandwidth or the frequency domain location.

2. The transmission bandwidth determination method of claim 1, wherein the one or more code points corresponding to the one or plurality of pieces of candidate transmission bandwidth information are configured by:
configuring a plurality of pieces of transmission bandwidth information;
selecting the one or plurality of pieces of candidate transmission bandwidth information from the plurality of pieces of transmission bandwidth information; and
mapping the one or plurality of pieces of candidate transmission bandwidth information to the one or more code points of the transmission bandwidth indication information in a field of the downlink control information.

3. The transmission bandwidth determination method of claim 1, further comprising:
determining the transmission bandwidth to be a carrier bandwidth, or determining the frequency domain location to be a carrier frequency domain location, in response to the downlink control information without the transmission bandwidth indication information.

4. The transmission bandwidth determination method of claim 1, further comprising:
determining the transmission bandwidth to be a bandwidth of a bandwidth part or a subband, or determining the frequency domain location to be a frequency domain location of the bandwidth part or the subband, wherein data scheduled by the downlink control information is located in the bandwidth part or the subband.

5. The transmission bandwidth determination method of claim 1, further comprising:
determining the transmission bandwidth to be a bandwidth of a control resource set, or determining the frequency domain location to be a frequency domain location of the control resource set, in response to the downlink control information without the transmission bandwidth indication information, wherein a control channel of the downlink control information is located in the control resource set.

6. The transmission bandwidth determination method of claim 1, further comprising:
determining the transmission bandwidth to be a bandwidth of an initial access broadcast channel or of an initial bandwidth part in which a broadcast channel is located, or determining the frequency domain location to be a frequency domain location of the initial access broadcast channel or of the initial bandwidth part in which the broadcast channel is located, in response to the downlink control information without the transmission bandwidth indication information.

7. A transmission bandwidth determination device, the transmission bandwidth determination device, applied in a terminal, comprising:
a receiving unit configured to receive network configuration information, the network configuration information containing an information indication; and
a determining unit configured to determine, based on the information indication, whether downlink control information contains transmission bandwidth indication information;
wherein the determining unit is further configured to:
obtain the transmission bandwidth indication information from the downlink control information in response to the downlink control information containing the transmission bandwidth indication information;
select, based on a code point corresponding to the transmission bandwidth indication information, the transmission bandwidth information from one or more code points corresponding to one or a plurality of pieces of candidate transmission bandwidth information configured by a network layer; and
determine, based on the selected transmission bandwidth information, the transmission bandwidth or the frequency domain location indicated by the transmission bandwidth indication information.

8. The transmission bandwidth determination device of claim 7, wherein the one or more code points corresponding to the one or plurality of pieces of candidate transmission bandwidth information are configured by:
configuring a plurality of pieces of transmission bandwidth information;
selecting the one or plurality of pieces of candidate transmission bandwidth information from the plurality of pieces of transmission bandwidth information; and
mapping the one or plurality of pieces of candidate transmission bandwidth information to the one or more code points of the transmission bandwidth indication information in a field of the downlink control information.

9. The transmission bandwidth determination device of claim 7, wherein the determining unit is further configured to:
determine the transmission bandwidth to be a carrier bandwidth, or determine the frequency domain location to be a carrier frequency domain location, in response to the downlink control information without the transmission bandwidth indication information.

10. The transmission bandwidth determination device of claim 7, wherein the determining unit is further configured to:
   determine the transmission bandwidth to be a bandwidth of a bandwidth part or a subband, or determine the frequency domain location to be a frequency domain location of the bandwidth part or the subband, wherein data scheduled by the downlink control information is located in the bandwidth part or the subband, in response to the downlink control information without the transmission bandwidth indication information.

11. The transmission bandwidth determination device of claim 7, wherein the determining unit is further configured to:
   determine the transmission bandwidth to be a bandwidth of a control resource set, or determine the frequency domain location to be a frequency domain location of the control resource set, in response to the downlink control information without the transmission bandwidth indication information, wherein a control channel of the downlink control information is located in the control resource set.

12. The transmission bandwidth determination device of claim 7, wherein the determining unit is further configured to:
   determine the transmission bandwidth to be a bandwidth of an initial access broadcast channel or of an initial bandwidth part in which a broadcast channel is located, or determine the frequency domain location to be a frequency domain location of an initial access broadcast channel or of the initial bandwidth part in which the broadcast channel is located, in response to the downlink control information without the transmission bandwidth indication information.

13. A terminal, comprising:
   a processor; and
   a memory device configured to store a set of instructions executable by the processor;
   wherein the processor is configured to implement the transmission bandwidth determination method of claim 1 when executing the set of instructions.

14. A non-volatile computer readable storage medium that stores a set of computer program instructions that is executable by a processor, wherein the set of computer program instructions, when executed by the processor, implements the transmission bandwidth determination method of claim 1.

* * * * *